United States Patent
Chen et al.

(10) Patent No.: US 9,606,636 B2
(45) Date of Patent: Mar. 28, 2017

(54) OPTICAL PROCESSING APPARATUS, LIGHT SOURCE LUMINANCE ADJUSTMENT METHOD, AND NON-TRANSITORY COMPUTER READABLE MEDIUM THEREOF

(71) Applicant: PIXART IMAGING INC., Hsin-Chu (TW)

(72) Inventors: Chun-Wei Chen, Hsin-Chu (TW); Ren-Hau Gu, Hsin-Chu (TW); Ching-Lin Chung, Hsin-Chu (TW)

(73) Assignee: PIXART IMAGING INC., Hsin-chu (TW)

( * ) Notice: Subject to any disclaimer, the term of this patent is extended or adjusted under 35 U.S.C. 154(b) by 0 days.

(21) Appl. No.: 15/240,120

(22) Filed: Aug. 18, 2016

(65) Prior Publication Data

US 2016/0357273 A1    Dec. 8, 2016

Related U.S. Application Data

(62) Division of application No. 13/959,225, filed on Aug. 5, 2013.

(30) Foreign Application Priority Data

Feb. 4, 2013   (TW) .............................. 102104112 A (51) Int. Cl.
  *H04N 5/235*   (2006.01)
  *G06F 3/033*   (2013.01)
  *G06F 3/03*    (2006.01)

(52) U.S. Cl.
  CPC ......... *G06F 3/0308* (2013.01); *H04N 5/2353* (2013.01); *H04N 5/2354* (2013.01)

(58) Field of Classification Search
  CPC ... G06F 3/0308; H04N 5/2353; H04N 5/2354
  See application file for complete search history.

(56) References Cited

U.S. PATENT DOCUMENTS

2006/0255152 A1*  11/2006  Xie .................. G06F 3/0383
                                              235/472.01
2008/0062149 A1*   3/2008  Baruk ............... G06F 3/0421
                                              345/175

(Continued)

OTHER PUBLICATIONS

US Final Office Action corresponding to U.S. Appl. No. 13/959,225; Date of Mailing: Apr. 28, 2016.

(Continued)

*Primary Examiner* — Amr Awad
*Assistant Examiner* — Stephen Bray
(74) *Attorney, Agent, or Firm* — Cantor Colburn LLP (57) ABSTRACT

An optical processing apparatus, a light source luminance adjustment method, and a non-transitory computer readable medium thereof are provided. The optical processing apparatus includes a light source unit, a processing unit, and an image sensing unit, wherein the processing unit is electrically connected to the light source unit and the image sensing unit. The light source unit provides a beam of light. The processing unit defines a frame rate, defines a plurality of time instants within a time interval, and sets the light source unit to a luminance value at each of the time instants. A length of the time interval is shorter than the reciprocal of the frame rate. The luminance values are different and are within a range. The image sensing unit captures an image by an exposure time length at each of the time instants, wherein the exposure time lengths are the same.

4 Claims, 4 Drawing Sheets

(56) References Cited

U.S. PATENT DOCUMENTS

| | | | |
|---|---|---|---|
| 2009/0195505 A1* | 8/2009 | Chen | G06F 1/3203 345/166 |
| 2010/0195935 A1 | 8/2010 | Brosnan | |
| 2012/0127128 A1* | 5/2012 | Large | G06F 3/0425 345/175 |
| 2012/0274606 A1* | 11/2012 | Song | G06F 3/042 345/175 |

OTHER PUBLICATIONS

US Non Final Office Action corresponding to U.S. Appl. No. 13/959,225; Date of Mailing: Sep. 18, 2015.

* cited by examiner

OPTICAL PROCESSING APPARATUS, LIGHT SOURCE LUMINANCE ADJUSTMENT METHOD, AND NON-TRANSITORY COMPUTER READABLE MEDIUM THEREOF

CROSS-REFERENCES TO RELATED APPLICATIONS

The present application is a divisional application of U.S. patent application Ser. No. 13/959,225, filed on Aug. 5, 2013, the entire contents of which are incorporated herein by reference. The Ser. No. 13/959,225 application claimed the benefit of the date of the earlier filed Taiwan Patent Application No. 102104112 filed on Feb. 4, 2013, priority to which is also claimed herein, and the contents of which are also incorporated by reference herein.

BACKGROUND OF THE INVENTION

Field of the Invention

The present invention relates to an optical processing apparatus, a light source luminance adjustment method, and a non-transitory computer readable medium thereof. More particularly, the present invention relates to an optical processing apparatus, a light source luminance adjustment method, and a non-transitory computer readable medium thereof that can adjust the luminance settings of a light source according to the image quality.

Descriptions of the Related Art

With the development of science and technologies, optical touch control technologies have gradually found application in various fields. Accordingly, various kinds of optical processing apparatuses such as optical navigation apparatuses, optical touch panels, and the like, have been developed.

In conventional optical processing apparatuses, a light source unit is used to project a beam of light onto a reflective surface. An image is captured by an image sensing unit so that a processing unit can execute subsequent operations according to the captured image. For example, if the optical processing apparatus is an optical navigation apparatus, a processing unit thereof compares the images that are consecutively captured to determine the amount of displacement of the optical navigation apparatus within a time interval. Then, a cursor displayed on the screen is controlled according to the amount of displacement for navigation purposes. As can be seen from this, the result of the processing unit is determined by the quality of the images captured by the image sensing unit. For example, for some optical processing apparatuses, images that are too bright or too dark will have an adverse effect on the result of the subsequent determination and be considered to have poor quality.

One conventional optical processing apparatuses has improved the aforesaid problem by adjusting the exposure time length used to capture images. Specifically, the exposure time length used to capture the subsequent image will be reduced when the captured image is too bright. Conversely, the exposure time length used to capture the subsequent image will be extended when the captured image is too dark. However, when this practice is adopted, the frame rate of the optical processing apparatus will be limited if the exposure time length becomes too long.

Another conventional optical processing apparatuses that has improved the aforesaid problem adjusts the gain value of the programmable gain amplifier (PGA). Specifically, the gain value used to capture the subsequent image will be reduced when the captured image is too bright. Conversely, the gain value used to capture the subsequent image will be increased when the captured image is too dark. However, too great a gain value will cause too many noises in the image, which undesirably makes the image quality poorer instead.

Accordingly, it is important to provide a technology capable of adjusting the settings of an optical processing apparatus according to the quality of the captured image. In case of poor image quality, the optical processing apparatus can still adjust the settings to make the quality of the subsequent captured images desirable. In this way, the optical processing apparatus or other apparatuses that are used with the optical processing apparatus can use an image that has a desirable quality for subsequent determinations and operations.

SUMMARY OF THE INVENTION

To improve the aforesaid problems, the present invention provides an optical processing apparatus, a light source luminance adjustment method, and a non-transitory computer readable medium thereof.

The optical processing apparatus of the present invention comprises a light source unit, a processing unit, and an image sensing unit. The processing unit is electrically connected to the light source unit and the image sensing unit. The light source unit is configured to provide a beam of light. The processing unit defines a frame rate, defines a plurality of time instants within a time interval, and sets the light source unit to a luminance value at each of the time instants. A length of the time interval is shorter than a reciprocal of the frame rate. The luminance values are different and are within a range. The image sensing unit captures an image by an exposure time length at each of the time instants, wherein the exposure time lengths are the same.

The light source luminance adjustment method of the present invention is adapted for use in an optical processing apparatus, which comprises a light source unit, a processing unit, and an image sensing unit. The light source unit is able to provide a beam of light, while the processing unit defines a frame rate. The light source luminance adjustment method comprises the following steps: (a) defining a plurality of time instants within a time interval by the processing unit, wherein the length of the time interval is shorter than the reciprocal of the frame rate; (b) setting the light source unit to a luminance value at each of the time instants by the processing unit, wherein the luminance values are different and are within a range; and (c) capturing an image by an exposure time length at each of the time instants by the image sensing unit, wherein the exposure time lengths are the same.

The non-transitory computer readable medium of the present invention has a computer program stored therein. The computer program executes a light source luminance adjustment method after being loaded into an optical processing apparatus. The optical processing apparatus comprises a light source unit, a processing unit, and an image sensing unit. The light source unit is able to provide a beam of light. The computer program comprises code A, code B, and code C. When code A is executed, the processing unit defines a plurality of time instants within a time interval. When code B is executed, the processing unit sets the light source unit to a luminance value at each of the time instants, wherein the luminance values are different and are within a range. When code C is executed, the image sensing unit captures an image by an exposure time length at each of the time instants, wherein the exposure time lengths are the same.

As can be seen from the above descriptions, the present invention defines a plurality of time instants within a time interval (the length of this time interval is shorter than the reciprocal of the frame rate of the optical processing apparatus). At different time instants, the light source unit is set to different luminance values and the image sensing unit captures an image by the same exposure time length. In other words, the present invention captures multiple images by controlling the luminance of the light source unit. With this mechanism, the present invention can further provide a wide variety of operation modes. For example, the present invention may further determine the image qualities of these images and select at least one of the images which has an optimal or preferable image quality as an image representing this time interval. As another example, the present invention may also take the light source luminance value, which is used to capture the image with an optimal or preferable image quality, of the light source unit as a basic luminance value of the light source unit within the next time interval so that subsequent captured will have desirable qualities.

The detailed technology and preferred embodiments implemented for the subject invention are described in the following paragraphs accompanying the appended drawings for people skilled in this field to well appreciate the features of the claimed invention.

DESCRIPTION OF THE PREFERRED EMBODIMENT

In the following description, the optical processing apparatus, the light source luminance adjustment method, and the non-transitory computer readable medium thereof according to the present invention will be explained with reference to embodiments thereof. However, these embodiments are not intended to limit the present invention to any specific environment, applications, or particular implementations described in these embodiments. Therefore, the description of these embodiments is only for the purpose of illustration rather than limitation. It should be appreciated that elements unrelated to the present invention are omitted from depiction in the following embodiments and the attached drawings.

Figure 1A:
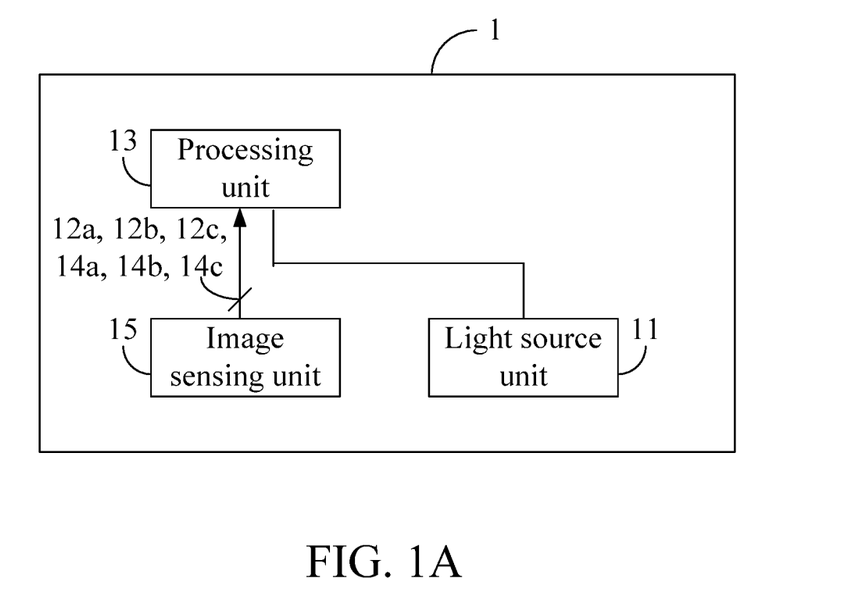
FIG. 1A is a schematic view depicting an optical processing apparatus 1 according to the first embodiment.

The first embodiment of the present invention is an optical processing apparatus 1, a schematic view of which is depicted in FIG. 1A. The optical processing apparatus 1 comprises a light source unit 11, a processing unit 13, and an image sensing unit 15. The processing unit 13 is electrically connected to the light source unit 11 and the image sensing unit 15.

The light source unit 11 may be a light emitting diode (LED) or some other light source units well-known to those of ordinary skill in the art. The processing unit 13 may be of any various processors, central processing units (CPUs), microprocessors, or other computing devices well-known to those of ordinary skill in the art. The image sensing unit 15 may be a complementary metal oxide semiconductor (CMOS) light sensing unit or an image sensing unit well-known to those of ordinary skill in the art.

When the optical processing apparatus 1 is powered on, the light source unit 11 generates a beam of light (not shown), while the processing unit 13 and the image sensing unit 15 performs operations provided by the present invention.

Figure 1B:
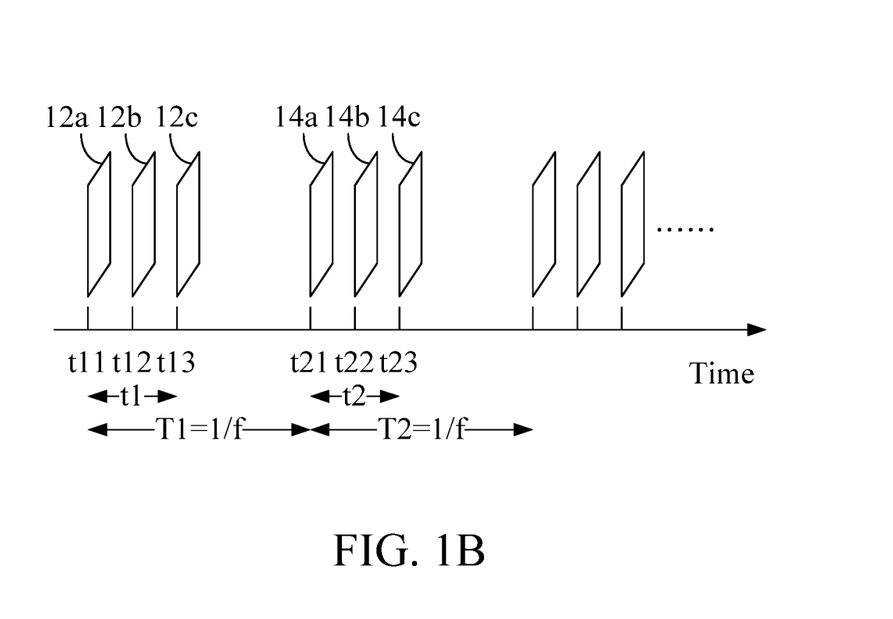
FIG. 1B is a schematic view depicting relationships between frame capturing periods, time intervals and images.

In this embodiment, the processing unit 13 defines a frame rate f. The frame rate f is the reciprocal of the frame capturing periods T1, T2 as shown in FIG. 1B. The time lengths of the frame capturing periods T1 and T2 are the same. It is noted that the frame capturing periods T1 and T2 being denoted as different reference symbols is only for indicating that they correspond to different frame capturing periods. The processing unit 13 defines a time interval t1 within the frame capturing period T1 and defines a plurality of time instants t11, t12, and t13 within the time interval t1. The time length of the time interval t1 is shorter than the time length of the frame capturing period T1. In other words, the time length of the time interval t1 is shorter than the reciprocal of the frame rate f.

The processing unit 13 sets the light beam provided by the light source unit 11 to a luminance value at each of the time instants t11, t12, and t13. It should be appreciated that the light beam of the light source unit 11 is set to different luminance values at each of the time instants t11, t12, and t13. The luminance values are within a first range. A specific example will now be described for illustration. It is assumed that the light source unit 11 has ten levels of luminance values and three levels (i.e., level 4 to level 6) of them are within the default range. When the optical processing apparatus 1 is powered on, the first range may be set to the default range. The light source luminance values set for the light source unit 11 at the time instants t11, t12, and t13 are respectively on level 4, level 5, and level 6 of the first range.

On the other hand, the image sensing unit 15 captures images 12a, 12b, and 12c respectively by the exposure time length at each of the time instants t11, t12, and t13. The exposure time lengths used to capture the images 12a, 12b, and 12c are the same. The above specific example is continued for illustration. The light source luminance value of the light source unit 11 is on level 4 at the time instant t11. The image sensing unit 15 captures the image 12a at this time instant.

Subsequently, the processing unit 13 calculates the image quality index of each of the images 12a, 12b, and 12c. The image quality index of each of the images 12a, 12b, and 12c may be a feature value (e.g., the number of pairs of bright and dark spots) and a luminance value of the corresponding image or other information value which can be used to determine the image quality. The processing unit 13 further derives a comparison result by comparing the image quality indices of the images 12a, 12b, and 12c with at least one threshold.

For example, when the image quality index is a feature value of the image, a higher image quality index represents a better image quality. In such a case, the processing unit 13 may derive the comparison result by comparing the image quality indices of the images 12a, 12b, and 12c with a threshold. The comparison result may indicate which images have image quality indices higher than the threshold and the sequence of those images.

As another example, when the image quality index is the luminance value (e.g., an averaged luminance value), image quality indices falling within a luminance value range (i.e., values between an upper threshold and lower threshold)

represent good image qualities, whereas image quality indices that are too high (higher than the upper threshold) or too low (lower than the lower threshold) represent bad image qualities. In such a case, the processing unit 13 may derive the comparison result by comparing the image quality indices of the images 12a, 12b, and 12c with the two thresholds. This comparison result may indicate which images have image quality indices between the two thresholds.

No matter what kind of information the image is used as the image quality index, the aforesaid comparison results can be classified into two categories. One category is that at least a part of the image quality indices meet the requirements (i.e., at least a part of the images 12a, 12b, and 12c have good image qualities), while the other category is that none of the image quality indices meets the requirements (i.e., the images 12a, 12b, and 12c all have bad image qualities). In the following description, the method in which the processing unit 13 subsequently determines the first selected image representing the time interval t1 and determines the second range of light source luminance values used by the light source unit 11 within the time interval t2 of the next frame capturing period T2 will be described with respect to each of the two classes respectively.

Now, the first class (i.e., the case in which at least a part of the image quality indices meet the requirement) will be described firstly. The processing unit 13 selects one of the images 12a, 12b, and 12c as a first selected image (e.g., the image 12c) representing the time interval t1 according to the comparison result. The first selected image can be considered as the image representing the frame capturing period T1. In particular, the processing unit 13 selects the image represented by one of the image quality indices that meet the requirement as the first selected image according to the comparison result. In case that the image quality index is the feature value, the processing unit 13 selects the image represented by any one of the image quality indices that are higher than the threshold as the first selected image. In the case that the image quality index is the luminance value of the image, the processing unit 13 selects the image represented by any one of the image quality indices ranging between the upper threshold and the lower threshold as the first selected image.

If the optical processing apparatus 1 continues operating, the processing unit 13 defines a time interval t2 within the frame capturing period T2 immediately after the frame capturing period T1. The time interval t2 occurs later than the time interval t1. Furthermore, the time length of the aforesaid time interval t2 is shorter than the time length of the frame capturing period T2. In other words, the time length of the time interval t2 is shorter than the reciprocal of the frame rate f.

The processing unit 13 sets a basic luminance value of the time interval t2 to the luminance value corresponding to the first selected image and determines a second range according to this basic luminance value. For example, the second range may comprise the basic luminance value as well as luminance values of one (or more) previous level and one (or more) subsequent level. Assuming that the first selected image is the image 12c and the image 12c is captured under conditions that the light source luminance value of the light source unit 11 is on level 6, then the basic luminance value of the time interval t2 is on level 6 while the second range ranges between level 5 to level 7.

Subsequently, the second class (i.e., the case in which none of the image quality indices meets the requirement) will be described. Since the comparison result indicates that none of the image quality indices meets the requirement, the processing unit 13 selects more than one of the images 12a, 12b and 12c as a plurality of first temporary images according to this comparison result. Then, the processing unit 13 derives an averaged image by averaging the first temporary images and sets the averaged image as the first selected image representing the time interval t1. The first selected image can also be considered as the image representing the frame capturing period T1.

Similarly, if the optical processing apparatus 1 continues operating, the processing unit 13 defines the time interval t2 within the frame capturing period T2 immediately after the frame capturing period T1. The time interval t2 occurs later than the time interval t1. Furthermore, the time length of the aforesaid time interval t2 is shorter than the time length of the frame capturing period T2. In other words, the time length of the aforesaid time interval t2 is shorter than the reciprocal of the frame rate f.

In such a case, the processing unit 13 determines the second range of the light source luminance value to be set for the light source unit 11 within the time interval t2. Since none of the image quality indices of the images 12a, 12b and 12c meets the requirement, the processing unit 13 adjusts the second range on the basis of the first range. For example, if the image quality index is the luminance value of the image and all of the image quality indices are lower than the lower threshold (i.e., the images 12a, 12b and 12c are too dark), the processing unit 13 may adjust each luminance value level within the first range to be higher by a predetermined number of levels and use the adjusted luminance value levels as the second range (e.g., when the first range is between level 4 to level 6, the second range may be set from level 6 to level 8), or may add one more level to the luminance value levels contained in the first range (e.g., when the first range is between level 4 to level 6, the second range may be set from level 4 to level 7). In the case that the image quality index is the luminance value of the image and all of the image quality indices are higher than the upper threshold, a reverse process can be performed. In case that the image quality index is the feature value of the image and all of the image quality indices are lower than the lower threshold, the processing unit 13 may also adjust each luminance value level within the first range to be higher with a predetermined number of levels. In addition, the adjusted luminance value levels may be used as the second range, or may add one more level to the luminance levels contained in the first range.

After the processing unit 13 has determined the second range of the light source luminance value to be used by the light source unit 11 within the time interval t2 of the next frame capturing period T2, a subsequent operation will be described next.

The processing unit 13 defines a plurality of time instants t21, t22 and t23 within the time interval t2. It should be appreciated that the number of time instants defined within the time interval t2 is the same as the number of the light source luminance value levels within the second range. Subsequently, the processing unit 13 sets the light beam provided by the light source unit 11 to a luminance value at each of the time instants t21, t22 and t23. It should be appreciated that the light source luminance values set for the light source unit 11 at each of the time instants t21, t22 and t23 are different and are within the second range. On the other hand, the image sensing unit 15 captures images 14a, 14b and 14c respectively by the same exposure time length at each of the time instants t21, t22 and t23.

Similarly, the processing unit 13 then calculates the image quality index of each of the images 14a, 14b and 14c. The image quality index of each of the images 14a, 14b and 14c may be the feature value, luminance value of the corresponding image or other informational value that can be used to determine the image quality. The processing unit 13 further derives a comparison result by comparing the image quality indices of the images 14a, 14b and 14c with at least one threshold. Afterwards, the processing unit 13 further selects a second selected image representing the time interval t2 according to the comparison result. For example, the processing unit 13 selects one of the images 14a, 14b and 14c as a second selected image (e.g., the image 14b) representing the time interval t2, or sets an averaged image of the images 14a, 14b and 14c as the second selected image. The second selected image can also be considered as the image representing the frame capturing period T2. If the optical processing apparatus 1 continues operating, operations similar to what has been described above can be repeated.

It should be appreciated that in this embodiment, the lengths of the time intervals defined by the processing unit 13 within different frame capturing periods are not necessarily the same as long as the lengths of the time intervals are shorter than the frame capturing periods (i.e., the reciprocal of the frame rate). Furthermore, the number of time instants defined by the processing unit 13 within different time intervals are not necessarily the same. In other words, the numbers of images captured by the image sensing unit 15 within different time intervals are not necessarily the same. For example, when images captured within the time intervals of a certain frame capturing period all have good qualities, it can be expected that images to be captured by the image sensing unit 15 within the next frame capturing period will also have good image qualities. Then the processing unit 13 may define fewer time instants within the time intervals of the next frame capturing period to decrease the number of images to be captured by the image sensing unit 15. With such a configuration, the resources consumed by the optical processing apparatus 1 can be duly reduced.

As can be seen from the above descriptions, the optical processing apparatus 1 defines a time interval within each frame capturing period, captures multiple images with different light source luminance values within this time interval, and further calculates the image quality index of each image. When at least a part of the images have good qualities, the optical processing apparatus 1 selects an image with good image quality as the image representing this time interval. The light source luminance value, which is used to capture the image with good image quality, is then set as the basic luminance value to be used by the light source unit within the next frame capturing period. When all of the images have bad qualities, the optical processing apparatus selects the averaged image of these images as the image representing this time interval and duly adjusts the range of the light source luminance values to be used within the next frame capturing period. Since the range of the luminance values to be used by the light source unit within the next frame capturing period is adjusted based on the image qualities, it can be expected that images to be captured by the image sensing unit 15 within the next frame capturing period will have preferable image qualities.

Furthermore, since the optical processing apparatus 1 adjusts the light source luminance value of the light source unit instead of adjusting the exposure time length used to capture images or adjusting the gain value of a programmable gain amplifier, the optical processing apparatus 1 does not have the shortcomings of the prior art.

Figure 2A:
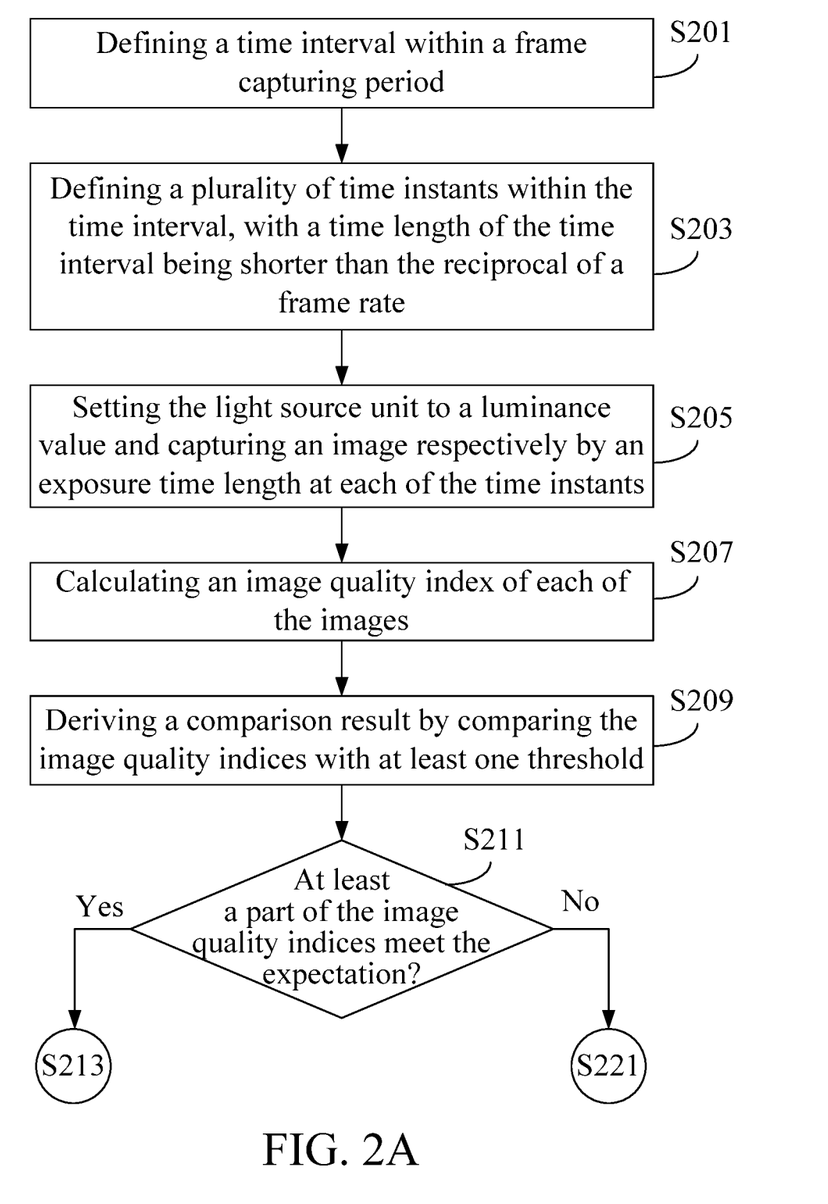
FIGS. 2A, 2B and 2C are flowchart diagrams depicting the second embodiment.
Figure 2B:
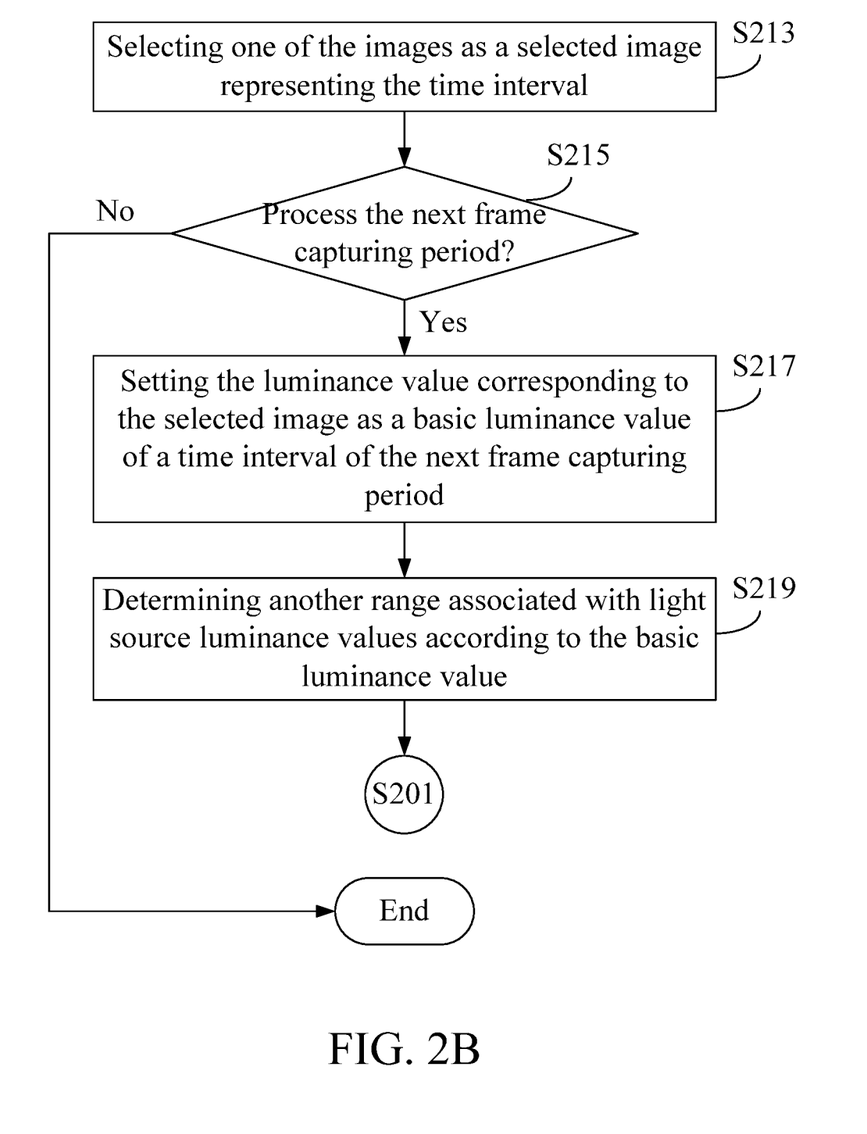
Figure 2C:
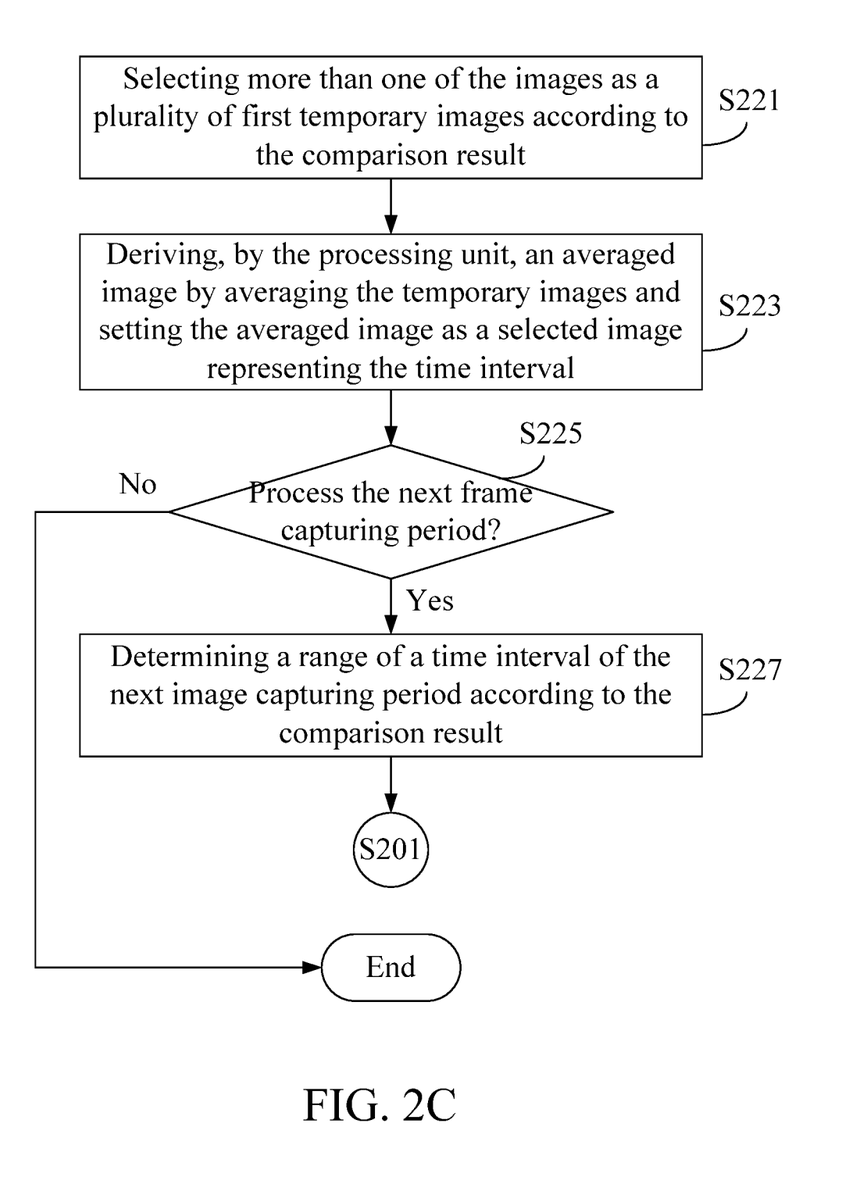

The second embodiment of the present invention is a light source luminance adjustment method, a flowchart diagram of which is depicted in FIGS. 2A, 2B and 2C. The light source luminance adjustment method is adapted for use in an optical processing apparatus (e.g., the optical processing apparatus 1 of the first embodiment). The optical processing apparatus comprises a light source unit, an image sensing unit, and a processing unit. The light source unit provides a beam of light, while the processing unit defines a frame rate.

The light source luminance adjustment method first executes step S201 to define, by the processing unit, a time interval within a frame capturing period. Subsequently, step S203 is executed to define, by the processing unit, a plurality of time instants within the time interval, with the time length of the time interval being shorter than the reciprocal of the frame rate.

Then, step S205 is executed to set, by the processing unit, the light source unit to a luminance value and to capture, by the image sensing unit, an image by an exposure time length at each of the time instants. It should be appreciated that the luminance values set at different time instants are different and are within a range. Furthermore, the exposure time lengths used to capture images at different time instants are the same. Subsequently, step S207 is executed to calculate, by the processing unit, an image quality index of each of the images. Then, step S209 is executed to derive, by the processing unit, a comparison result by comparing the image quality indices with at least one threshold.

Subsequently, step S211 is executed to determine whether at least a part of the image quality indices meet the requirement (i.e., whether at least a part of the images captured in step S205 have good image qualities) according to the comparison result. If the answer is "yes", step S213 is executed to select, by the processing unit, one of the images as a selected image representing the time interval according to the comparison result. More particularly, in step S213, the image corresponding to the image quality index that meets the requirement is selected as the selected image.

Then, step S215 is executed to determine, by the processing unit, whether to process the next frame capturing period. If the answer is "yes", step S217 is executed to set, by the processing unit, a basic luminance value of a time interval of the next frame capturing period to the luminance value corresponding to the selected image. Subsequently, step S219 is executed to determine, by the processing unit, another range of light source luminance values according to the basic luminance value. Then, step S201 is executed again. If the determination result of step S215 is no, the light source luminance adjustment method is finished.

If the determination result of step S211 is no (i.e., none of the image quality indices meets the requirement, or in other words, images captured in step S205 all have bad image qualities), step S221 is executed.

In step S221, the processing unit selects more than one of the images as a plurality of first temporary images according to the comparison result. More particularly, the processing unit may select all of the images as the temporary images. Subsequently, in step S223, the processing unit derives an averaged image by averaging the temporary images and sets the averaged image as the selected image representing the time interval.

Then, step S225 is executed to determine, by the processing unit, whether to process the next frame capturing period. If the answer is "yes", step S277 is executed to determine, by the processing unit, the range of a time interval of the next frame capturing period according to the comparison result. It should be appreciated that the range determined in step S227 is associated with the light source luminance value to be used by the light source unit within the time interval of the next frame capturing period. Furthermore, the range determined in step S227 is different from that in step S205. Then, step S201 is executed again. On the other hand, if the determination result of step S225 is no, the light source luminance adjustment method is finished.

In addition to the aforesaid steps, the second embodiment can also execute all the operations and functions set forth in the first embodiment. The method in which the second embodiment executes these operations and functions will be readily appreciated by those of ordinary skill in the art based on the explanation of the first embodiment, and thus, will not be further described herein.

Moreover, the light source luminance adjustment method described in the second embodiment may be implemented by a non-transitory computer readable medium. The non-transitory computer readable medium has a computer program stored therein. The computer program executes the light source luminance adjustment method described in the second embodiment after being loaded into an optical processing apparatus. The computer program may be a file that can be transmitted through a network, or may be stored in a tangible machine-readable medium, such as a read only memory (ROM), a flash memory, a floppy disk, a hard disk, a compact disk, a mobile disk, a magnetic tape, a database accessible to networks, or any other storage media with the same function and well known to those skilled in the art.

According to the above descriptions, the present invention defines a time interval within each frame capturing period, captures multiple images with different light source luminance values within this time interval, and further calculates the image quality index of each of the images. When at least a part of the images have good qualities, one of the images with a good image quality is selected as the image representing this time interval. The light source luminance value used to capture the image with good image quality is set as the basic luminance value to be used by the light source unit within the next frame capturing period. When all of the images have bad image qualities, an averaged image of the images is set as the image representing this time interval and a range of light source luminance values to be used within the next frame capturing period is duly adjusted. Since the range of luminance values to be used by the light source unit within the next frame capturing period is adjusted based on the image qualities, it can be expected that images to be captured within the next frame capturing period will have preferable image qualities. Moreover, since the present invention adjusts the light source luminance of the light source unit instead of adjusting the exposure time length used to capture images or adjusting the gain value of the programmable gain amplifier, it does not have the shortcomings of the prior art.

The above disclosure is related to the detailed technical contents and inventive features thereof. People skilled in this field may proceed with a variety of modifications and replacements based on the disclosures and suggestions of the invention as described without departing from the characteristics thereof. Nevertheless, although such modifications and replacements are not fully disclosed in the above descriptions, they have substantially been covered in the following claims as appended.

What is claimed is:

1. An optical processing apparatus, comprising:
a light source unit, being configured to provide a beam of light;
a processing unit, being electrically connected to the light source unit and configured to define a frame rate, define a plurality of first time instants within a first time interval, and set the beam of light provided by the light source unit to a luminance value at each of the first time instants, wherein a length of the first time interval is shorter than a reciprocal of the frame rate and the luminance values are different and within a first range; and
an image sensing unit, being electrically connected to the processing unit and configured to capture a first image by an exposure time length at each of the first time instants, wherein the exposure time lengths are the same,
wherein the processing unit further calculates an image quality index of each of the first images, derives a comparison result by comparing the image quality indices with at least one threshold, and selects more than one of the first images as a plurality of first temporary images when the image quality indices do not meet the at least one threshold;
wherein the processing unit further derives an averaged image by averaging the first temporary images and sets the averaged image as a first selected image representing the first time interval;
wherein the processing unit further decides a second range corresponding to a second time interval according to the comparison result, the second time interval occurs later than the first time interval, a length of the second time interval is shorter than the reciprocal of the frame rate, the second range is different from the first range, the processing unit further defines a plurality of second time instants within the second time interval, the processing unit further sets the beam of light provided by the light source unit to a luminance value at each of the second time instants, the luminance values corresponding to the second time interval are different and within the second range, and the image sensing unit further captures a second image by the exposure time length at each of the second time instants.

2. The optical processing apparatus of claim 1, wherein each image quality index is one of a feature value and a luminance value of the corresponding first image.

3. A light source luminance adjustment method, being adapted for use in an optical processing apparatus comprising a light source unit, a processing unit, and an image sensing unit, the light source unit providing a beam of light, the processing unit defining a frame rate, and the light source luminance adjustment method comprising the steps of:
defining, by the processing unit, a plurality of first time instants within a first time interval, wherein a length of the first time interval is shorter than a reciprocal of the frame rate;
setting, by the processing unit, the beam of light provided by the light source unit to a luminance value at each of the first time instants, wherein the luminance values are different and within a first range;
capturing, by the image sensing unit, a first image by an exposure time length at each of the first time instants, wherein the exposure time lengths are the same;
calculating, by the processing unit, an image quality index of each of the first images;

deriving, by the processing unit, a comparison result by comparing the image quality indices with at least one threshold; and selecting, by the processing unit, more than one of the first images as a plurality of first temporary images when the image quality indices do not meet the at least one threshold;

deriving, by the processing unit, an averaged image by averaging the first temporary images; and setting, by the processing unit, the averaged image as a first selected image representing the first time interval;

deciding, by the processing unit, a second range corresponding to a second time interval according to the comparison result, wherein the second time interval occurs later than the first time interval, a length of the second time interval is shorter than the reciprocal of the frame rate, and the second range is different from the first range;

defining, by the processing unit, a plurality of second time instants within the second time interval;

setting, by the processing unit, the beam of light provided by the light source unit to a luminance value at each of the second time instants, wherein the luminance values corresponding to the second time interval are different and within the second range; and capturing, by the image sensing unit, a second image by the exposure time length at each of the second time instants.

4. The light source luminance adjustment method of claim 3, wherein each image quality index is one of a feature value and a luminance value of the corresponding first image.

\* \* \* \* \*